US011692585B2

(12) United States Patent
Reed et al.

(10) Patent No.: US 11,692,585 B2
(45) Date of Patent: Jul. 4, 2023

(54) COMPOSITE SHAFT WITH OUTER PERIPHERY RING

(71) Applicant: Goodrich Corporation, Charlotte, NC (US)

(72) Inventors: Brayton Reed, Rome, NY (US); Joyel M. Schaefer, Earlville, NY (US); Michael King, Sauquoit, NY (US); Mark R. Gurvich, Middletown, CT (US)

(73) Assignee: Goodrich Corporation, Charlotte, NC (US)

(*) Notice: Subject to any disclaimer, the term of this patent is extended or adjusted under 35 U.S.C. 154(b) by 1079 days.

(21) Appl. No.: 16/247,966

(22) Filed: Jan. 15, 2019

(65) Prior Publication Data

US 2020/0224711 A1 Jul. 16, 2020

(51) Int. Cl.
  *B60K 17/24* (2006.01)
  *F16C 3/02* (2006.01)
  *B29C 73/10* (2006.01)
  *B29L 31/00* (2006.01)

(52) U.S. Cl.
  CPC .............. *F16C 3/026* (2013.01); *B29C 73/10* (2013.01); *B60K 17/24* (2013.01); *B29L 2031/75* (2013.01); *F16C 2208/02* (2013.01); *F16C 2237/00* (2013.01); *F16C 2326/06* (2013.01)

(58) Field of Classification Search
  CPC .. F16C 3/026; F16C 2208/02; F16C 2326/06; B60K 17/24
  USPC .......................................... 464/181; 180/381
  See application file for complete search history.

(56) References Cited

U.S. PATENT DOCUMENTS

| 2,939,748 | A | * | 6/1960 | Leach ..................... B60K 17/24 |
| 4,248,062 | A | | 2/1981 | McLain et al. |
| 4,695,340 | A | | 9/1987 | Matuska |
| 4,838,833 | A | | 6/1989 | Coursin |
| 4,895,551 | A | | 1/1990 | Fritz |
| 5,785,431 | A | | 7/1998 | Nilsson et al. |
| 5,827,168 | A | * | 10/1998 | Howell ............... F16F 15/1492 |
| 6,210,283 | B1 | | 4/2001 | Wojciechowski et al. |
| 6,820,654 | B2 | | 11/2004 | Lindsay |

(Continued)

FOREIGN PATENT DOCUMENTS

| CA | 1162408 A | 2/1984 |
| EP | 2412995 A1 | 2/2012 |

(Continued)

OTHER PUBLICATIONS

Partial European Search Report for EP Application No. 19210431.3 dated Jun. 9, 2020.

(Continued)

*Primary Examiner* — Greg Binda
(74) *Attorney, Agent, or Firm* — Carlson, Gaskey & Olds, P.C.

(57) ABSTRACT

A drive shaft has a central tubular portion formed of a polymer composite with imbedded fibers. It extends between a first end and a second end. The central tubular portion has an outer peripheral surface. There is at least one ring on the outer peripheral surface of the central tubular portion. A method of repairing a composite material tube includes the steps of (a) identifying a damaged area on a composite tube, and (b) placing a patch on a surface of the tube and over the damaged area.

8 Claims, 2 Drawing Sheets

(56) References Cited

U.S. PATENT DOCUMENTS

| | | |
|---|---|---|
| 7,367,774 B2 | 5/2008 | Bourget et al. |
| 8,984,940 B2 | 3/2015 | Josefczyk |
| 10,004,960 B2 | 6/2018 | Shimono et al. |
| 2011/0265936 A1 | 11/2011 | Hood |
| 2015/0247454 A1 | 9/2015 | Laureano et al. |
| 2016/0281767 A1 | 9/2016 | Mori |
| 2019/0003522 A1 | 1/2019 | Bernard et al. |
| 2019/0128317 A1 | 5/2019 | Giannakopoulos |

FOREIGN PATENT DOCUMENTS

| | | |
|---|---|---|
| GB | 2406154 A | 3/2005 |
| JP | H1-229110 | 9/1989 |
| WO | 2016/180901 A1 | 11/2016 |

OTHER PUBLICATIONS

NASA, Buckling of Thin-Walled Circular Cylinders, NASA Space Vehicle Design Criteria [Structures], NASA SP-8007, Sep. 1965, Revised Aug. 1968, pp. 1-60.

European Search Report for EP Application No. 19216567.8 dated May 26, 2020.

European Search Report for EP Application No. 19210431.3 dated Sep. 9, 2020.

Partial European Search Report for EP Application No. 21200749.6 dated Dec. 3, 2021.

European Search Report for EP Application No. 21200749.6 dated Mar. 9, 2022.

Automated Dynamics, Automatic Fiber Placement, retrieved from http://www.automateddynamics.com/article/thermoplastic-composite-basics/processing-methods/automated-fiber-placement on Aug. 30, 2019.

Automated Dynamics, Tape Laying, retrieved from http://www.automateddynamics.com/automation-equipment/tape-laying on Oct. 17, 2019.

Definition of Automated fiber placement, retrieved from https://en.wikipedia.org/wiki/Automated_fiber_placement on Oct. 17, 2019.

Automated Tape Laying (ATP) / Automated Fiber Placement (AFP): CompositesWorld, retrieved from https://www.compositesworld.com/zones/automatic-tape-laying-and-fiber-placement on Oct. 17, 2019.

* cited by examiner

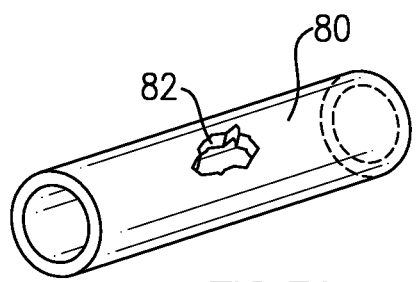
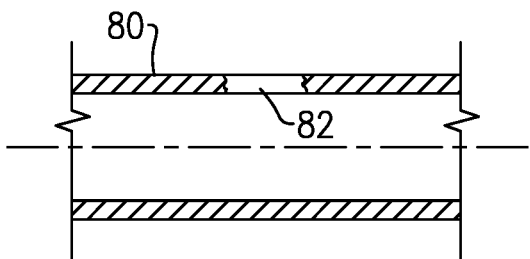
FIG.3A  FIG.3B
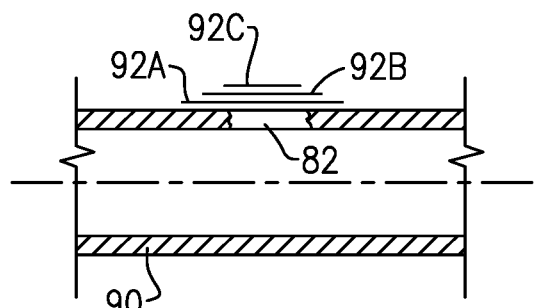
FIG.4A
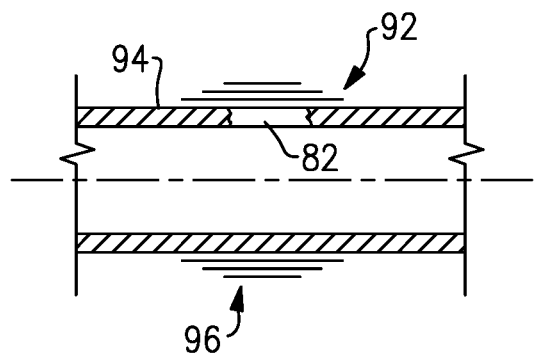
FIG.4B
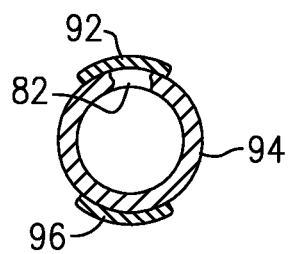
FIG.4C

COMPOSITE SHAFT WITH OUTER PERIPHERY RING

BACKGROUND

This application relates to composite drive shafts and methods of repair.

Drive shafts are utilized in any number of modern industrial applications. As one example, drive shafts are utilized to drive components in an aerospace environment. One specific application might be driving propellers associated with a helicopter, as an example.

Drive shafts might have some bending flexure along the length during operation. Thus, it is known to position dampers or other structures along the length of the drive shaft to limit this bending deflection. The dampers are often associated with a "rub ring" which is an element extending radially outwardly of the drive shaft to contact the damper and protect, therefore, the outer surface of the shaft in case of contact with the damper.

Historically, drive shafts were formed of metal and, in particular, often aluminum, titanium or steel. More recently, it has been proposed to provide drive shafts formed of composite materials.

Drive shafts may also become damaged. They are often replaced once damaged instead of being repaired.

SUMMARY

A drive shaft has a central tubular portion formed of a polymer composite with imbedded fibers. It extends between a first end and a second end. The central tubular portion has an outer peripheral surface. There is at least one ring on the outer peripheral surface of the central tubular portion.

A method of repairing a composite material tube includes the steps of (a) identifying a damaged area on a composite tube, and (b) placing a patch on a surface of the tube and over the damaged area.

These and other features may be best understood from the following drawings and specification.

BRIEF DESCRIPTION OF THE DRAWINGS

FIG. 3A shows a damaged drive shaft.

FIG. 3B is an axial cross-section through the damaged drive shaft.

FIG. 4A shows an axial cross-sectional view of a repair step.

FIG. 4B shows an axial cross-sectional view of an optional second repair step.

FIG. 4C is a diametric cross-section through the FIG. 4B drive shaft.

DETAILED DESCRIPTION

Figure 1A:
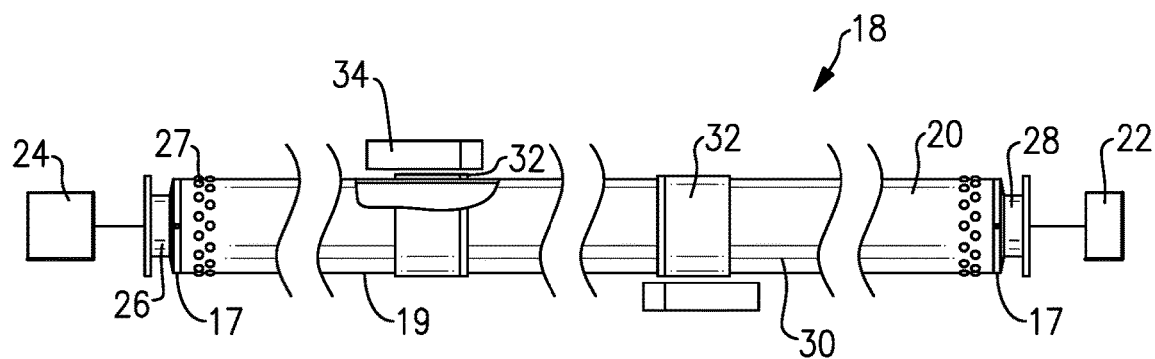
FIG. 1A shows a side view of a drive shaft schematically driving a component.

FIG. 1A shows a drive system 18 having a drive shaft 20. Drive shaft 20 may have a central composite tubular portion 30 connecting two metallic flanges 26 and 28 at ends 17 of the central tubular portion 30. The flanges may be riveted such as shown at 27 or connected with the shaft 20 by other fasteners. A drive input 22 drives the shaft 20 to, in turn, drive the drive output 24. The output 24 may be an aerospace component and, in one example a propeller on a helicopter. While metallic flanges 26/28 are illustrated, the flange could be composite. In fact, the tubular portion could be used without end flanges at all.

Rub rings 32 are shown on an outer peripheral surface 19 of the central tubular portion 30. The rub rings 32 are axially aligned with static components such as a damper 34. During operation, there may be flexing along the length of the central tubular portion 30 and the rub rings 32 may contact the damper 34 to limit that flexing.

Figure 1B:
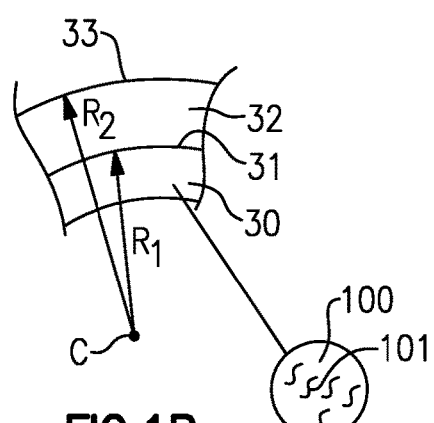
FIG. 1B schematically shows a detail of a rub ring in a diametric cross-sectional view.

FIG. 1B shows a detail with regard to the rub rings 32 and the central tubular portion 30. A first radius $R_1$ may be defined from a center C of the composite tubular portion 30 to an outer peripheral surface 31 of the composite tubular portion 30. A second radius $R_2$ may be defined from the center C to an outer peripheral surface 33 of the rub ring 32. A ratio of $R_2$ to $R_1$ is greater than or equal to 1.01 and less than or equal to 1.50. In further embodiments, the ratio is less than or equal to 1.25.

The central tubular portion 30 is formed of a fiber-reinforced thermoplastic material. The components of the central tubular portion and the rings may be formed of the same or different fiber-reinforced polymer matrix composite materials. In one embodiment, the matrix 100 can be a thermoplastic polymer. In another embodiment, the matrix can be a thermoset polymer. Different types of reinforcing fibers 101, such as, for example, carbon fibers, glass fibers, organic fibers, or their combinations can be used in different embodiments. In different embodiments, the same or different fabrication processes, such as for example, automated fiber placement, filament winding, braiding, wrapping, etc. can be used to make separate composite tubes, flanges and, if applicable, diaphragms.

Figure 2A:
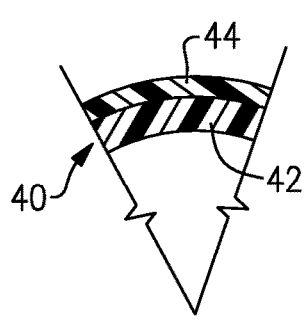
FIG. 2A shows a diametric cross-section of a first embodiment of a rub ring.

FIG. 2A shows a first embodiment 40 wherein the shaft inner tube portion 42 is provided with the ring 44. Ring 44 may be formed of the same general material as the tube 42. On the other hand, there may be some difference in composition, such as fiber type, fiber volume fraction percentage, fiber arrangement, polymer matrix type, etc. dependent on the operational needs for the particular location on that shaft.

In embodiments, the ring could be formed of polymer material, with, or without, embedded fibers.

When central tubular portion 42 and ring 44 are formed of the same material, they may be bonded together during formation.

Figure 2B:
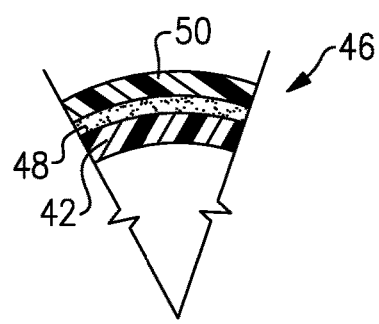
FIG. 2B shows a diametric cross-section of a second embodiment of a rub ring.

FIG. 2B shows an embodiment 46, where the central tubular portion 42 is attached to a ring 50 through an adhesive 48.

The ring 50 in the embodiment 46 may be formed of a different material than the central tubular portion 42. Ring 50 might be a distinct thermoplastic, a thermoset, or even a metallic component. Here too the same material may be used.

Figure 2C:
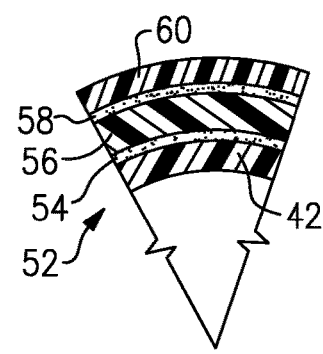
FIG. 2C shows a diametric cross-section of a third embodiment of a rub ring.

FIG. 2C shows yet another embodiment 52. Here, the central tubular portion 42 is provided with a ring 56 through an optional adhesive layer 54. Ring 56 and central tubular portion 42 might actually be similar to either embodiment 40 or 46. However, an outer elastomer ring 60 is provided with a bond layer 58 to the outer periphery of the ring 56. This elastomer ring at layer 60 can provide further cushioning during contact between the rub ring and a static component such as a damper 34.

In other embodiments, layer 60 is not limited to elastomers. This layer 60 may be of a low friction material, such as for example Teflon, to provide efficient interaction with damping ring 34. Layer 60 could be generically called a cushioning member.

A drive shaft according to this disclosure could be said as having a central tubular portion formed of a thermoset resin with imbedded fibers, and extending between a first end and a second end. The center tubular portion has an outer peripheral surface and there is at least one ring on the outer peripheral surface of the central tubular portion.

FIG. 3A shows another feature directed to repairing a damaged drive shaft 80. Here, damage 82 is shown. Damage 82 can be seen in an axial cross-section in FIG. 3B as a hole extending through an entire thickness of the tubular portion 80. However, it should be understood that the damage 82 need not extend through the entire thickness, and could be at least partial one at an inner or/and outer surface of the tube.

FIG. 4A shows a an axial cross-section with a first step in repairing the tubular portion 90 by utilizing one or more patches 92A, 92B, 92C. The patches may be similar in composition to the drive shaft materials. In other embodiments the materials of patches may be of different polymer matrices reinforced with different fibers, such as carbon, glass, organic fibers or their combinations, or have no fiber reinforcement at all. The patches need not extend around the entire circumference of the tubular portion, but may only be at a limited circumferential area.

FIG. 4B shows an axial cross-section with an optional feature wherein a second patch area 96 is provided to balance any radial misalignment that the first patch area 92 might have caused. The two patches 92 and 96 can be seen to be circumferentially spaced, but axially aligned. The location of patch 92 is selected to provide balancing of the tubular portion. Thus, a repaired tube or shaft 94 is shown in FIG. 4B, as an axial cross-section, and FIG. 4C, as a diametric cross-section, having the patch areas 92 and 96 at circumferentially opposed locations. It should be understood the patch could also extend around the entire circumference in some applications.

A method of repairing a composite material tube could be said to include the steps of (a) identifying a damaged area on a composite tube; and (b) placing a patch(s) on a surface of the tube and over the damaged area.

When considering the drive shaft embodiments of FIGS. 2A-2C along with the repaired shafts of FIGS. 4A and 4B, the term "ring" as utilized in this application could extend generically to either the circumferentially limited patches of FIGS. 4A and 4B or, of course, the full circumferentially extending rings of FIGS. 2A-2C.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A drive shaft and mount combination comprising:
   a central tubular portion formed of a polymer composite with imbedded fibers, and extending between a first end and a second end, said central tubular portion having an outer peripheral surface, there being at least one ring fixed on the outer peripheral surface of said central tubular portion;
   wherein said at least one ring is formed of at least one of a thermoplastic resin, a thermoset resin, or a metallic material; and
   wherein a static damper member is placed outwardly of said ring, during operation the drive shaft being potentially subject to flexing, such that said at least one ring can contact the static damper member to limit flexing.

2. The combination as set forth in claim 1, wherein there are a plurality of rings.

3. The combination as set forth in claim 2, wherein said plurality of rings are attached to said inner tube through an adhesive.

4. The combination as set forth in claim 2, wherein said plurality of rings are formed of a distinct material from said central tubular portion.

5. The combination as set forth in claim 1, wherein a metallic flange is attached to each of said first and second ends.

6. The combination as set forth in claim 1, wherein said ring is attached to said inner tube through an adhesive.

7. The combination as set forth in claim 1, wherein said ring is formed of a distinct material from said central tubular portion.

8. The combination as set forth in claim 1, wherein a first radius is defined to said outer peripheral surface of said central tubular portion and a second radius is defined to an outer peripheral surface of said at least one ring and a ratio of said second radius to said first radius is less than or equal to 1.50.

* * * * *